(12) United States Patent
Chung

(10) Patent No.: US 9,271,607 B2
(45) Date of Patent: Mar. 1, 2016

(54) APPARATUS FOR HOLDING A BIN-LINER ON A BARBECUE GRILL ASSEMBLY

(71) Applicant: Kiosky Chung, Taichung (TW)

(72) Inventor: Kiosky Chung, Taichung (TW)

(*) Notice: Subject to any disclaimer, the term of this patent is extended or adjusted under 35 U.S.C. 154(b) by 0 days.

(21) Appl. No.: 13/836,751

(22) Filed: Mar. 15, 2013

(65) Prior Publication Data

US 2014/0263309 A1 Sep. 18, 2014

(51) Int. Cl.
*A47J 37/07* (2006.01)
*B65F 1/14* (2006.01)

(52) U.S. Cl.
CPC .......... *A47J 37/0786* (2013.01); *B65F 1/1415* (2013.01)

(58) Field of Classification Search
CPC   B65B 67/12; B65B 67/1205; B65B 67/1222; B65B 2067/1261; A47J 37/0786; B65F 1/1415
USPC ........................ 248/95, 97, 99, 100, 101, 153, 248/300–304; 220/737, 485, 495.06, 491; 312/321.5; 383/9, 12, 33; 211/106, 211/119, 12
See application file for complete search history.

(56) References Cited

U.S. PATENT DOCUMENTS

| | | | | |
|---|---|---|---|---|
| 261,618 A * | 7/1882 | Lufkin | | 248/302 |
| 266,704 A * | 10/1882 | Lufkin | | 248/302 |
| 277,772 A * | 5/1883 | Nelson | | 248/100 |
| 307,929 A * | 11/1884 | Edwards | | 248/311.2 |
| 447,686 A * | 3/1891 | Holladay | | 248/97 |
| 666,296 A * | 1/1901 | Wiard | | 248/99 |
| 725,538 A * | 4/1903 | Brown | | 248/101 |
| 973,414 A * | 10/1910 | Eastham | | 248/100 |
| 1,014,487 A * | 1/1912 | Kinsley | | 211/106 |
| 1,452,144 A * | 4/1923 | Carlin | | 108/29 |
| 1,713,295 A * | 5/1929 | Miller | | 108/135 |
| 1,925,500 A * | 9/1933 | Richard | | 248/249 |
| 2,004,035 A * | 6/1935 | Cleveland | | 312/5 |
| 2,068,028 A * | 1/1937 | Jernson | | 211/104 |
| 2,398,166 A * | 4/1946 | Struensee | | 220/6 |
| 2,524,352 A * | 10/1950 | Kiser | | 220/9.1 |
| 2,894,708 A * | 7/1959 | Kaplan | | 248/99 |
| 2,965,344 A * | 12/1960 | Baker | | 248/101 |
| 3,145,408 A * | 8/1964 | Hertzel et al. | | 15/246.2 |
| 3,186,559 A * | 6/1965 | Glowa | | 211/150 |
| 3,529,766 A * | 9/1970 | Mott, Jr. et al. | | 232/43.2 |
| 3,870,261 A * | 3/1975 | McSwain | | 248/101 |
| 4,664,455 A * | 5/1987 | Greenhow | | 312/211 |
| 4,672,703 A * | 6/1987 | Frazier | | 5/503.1 |
| 4,712,692 A * | 12/1987 | Peinsipp | | 211/119 |
| 4,877,207 A * | 10/1989 | Farah | | 248/97 |
| 5,014,944 A * | 5/1991 | Malik et al. | | 248/99 |
| 5,125,517 A * | 6/1992 | Martinell | | 211/18 |
| 5,350,142 A * | 9/1994 | Kurtzman et al. | | 248/99 |
| 5,356,001 A * | 10/1994 | Luna | | 206/315.1 |
| 5,360,189 A * | 11/1994 | Hart | | 248/97 |
| 6,092,767 A * | 7/2000 | Schrager | | 248/98 |
| 6,530,494 B1 * | 3/2003 | Chen | | 220/485 |
| 7,243,884 B2 * | 7/2007 | Lawson et al. | | 248/95 |
| 7,404,531 B2 * | 7/2008 | McConnell | | 248/95 |
| 8,522,769 B2 * | 9/2013 | Ducate et al. | | 126/25 R |
| 8,590,524 B2 * | 11/2013 | Ducate, Jr. | | 126/25 R |
| 8,607,777 B2 * | 12/2013 | Ducate et al. | | 126/30 |
| 2005/0258117 A1 * | 11/2005 | Drake | | 211/106 |
| 2009/0044728 A1 * | 2/2009 | Tourounjian | | 108/42 |

* cited by examiner

*Primary Examiner* — Nkeisha Smith

(57) ABSTRACT

Disclosed is an apparatus for holding a bin-liner on a barbecue grill assembly. The apparatus includes a supporting unit and two frames. The supporting unit is connected to the barbecue grill assembly. The first frame is pivotally connected to the barbecue grill assembly. An upper portion of the bin-liner can be flipped and placed on the first frame. The second frame is pivotally connected to the first frame. The first frame is kept in a horizontal position as the second frame is supported on the supporting unit.

12 Claims, 7 Drawing Sheets

APPARATUS FOR HOLDING A BIN-LINER ON A BARBECUE GRILL ASSEMBLY

BACKGROUND OF INVENTION

1. Field of Invention

The present invention relates to a barbecue grill assembly and, more particularly, to an apparatus for holding a bin-liner on a barbecue grill assembly.

2. Related Prior Art

In a barbecue party, people enjoy cooperating with one another to cook food and enjoy the cooked food. A barbecue party that often takes place in an outdoor environment is more relaxing than a feast that often takes place in a restaurant. Hence, barbecue parties are very popular in close friends and families. Therefore have been devised many barbecue grill apparatuses.

After a barbecue party, there are often leftovers and garbage such as used brushes, sticks and paper napkin, disposable plates, bowls and cups, and empty bottles. Such garbage is often placed in a bin-liner. As mentioned above, a barbecue party often takes place in an outdoor environment, and in an outdoor environment, there is often wind strong enough to blow away the bin-liner, throw the garbage out of the bin-liner, and cause a mass.

Therefore, the present invention is intended to obviate or at least alleviate the problems encountered in prior art.

SUMMARY OF INVENTION

It is the primary objective of the present invention to provide an apparatus for holding a bin-liner on a barbecue grill assembly.

To achieve the foregoing objective, the apparatus includes a supporting unit and two frames. The supporting unit is connected to the barbecue grill assembly. The first frame is pivotally connected to the barbecue grill assembly. An upper portion of the bin-liner can be flipped and placed on the first frame. The second frame is pivotally connected to the first frame. The first frame is kept in a horizontal position as the second frame is supported on the supporting unit.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
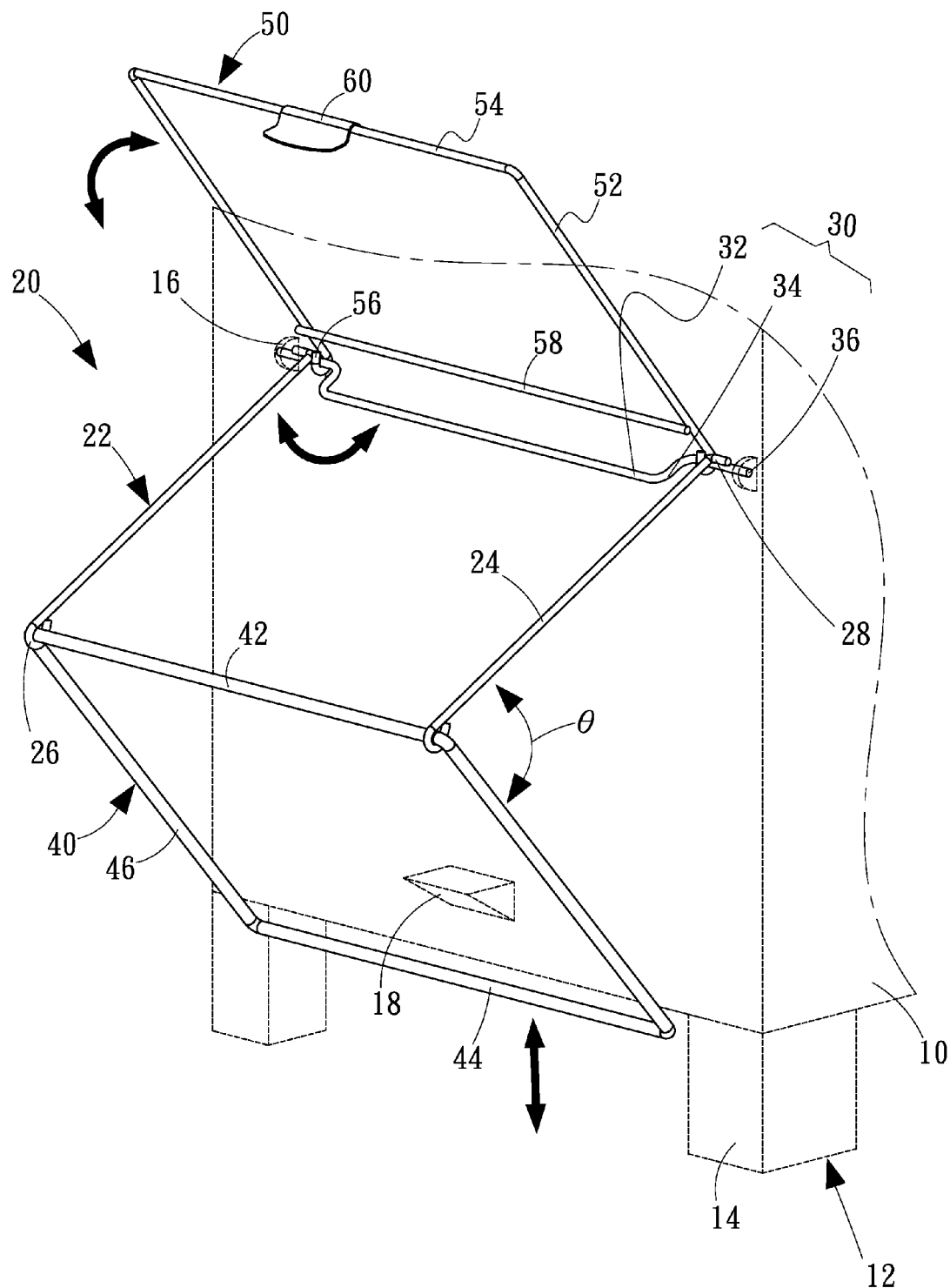
FIG. 1 is a perspective view of an apparatus for holding a bin-liner on a barbecue grill assembly according to the first embodiment of the present invention.
Figure 2:
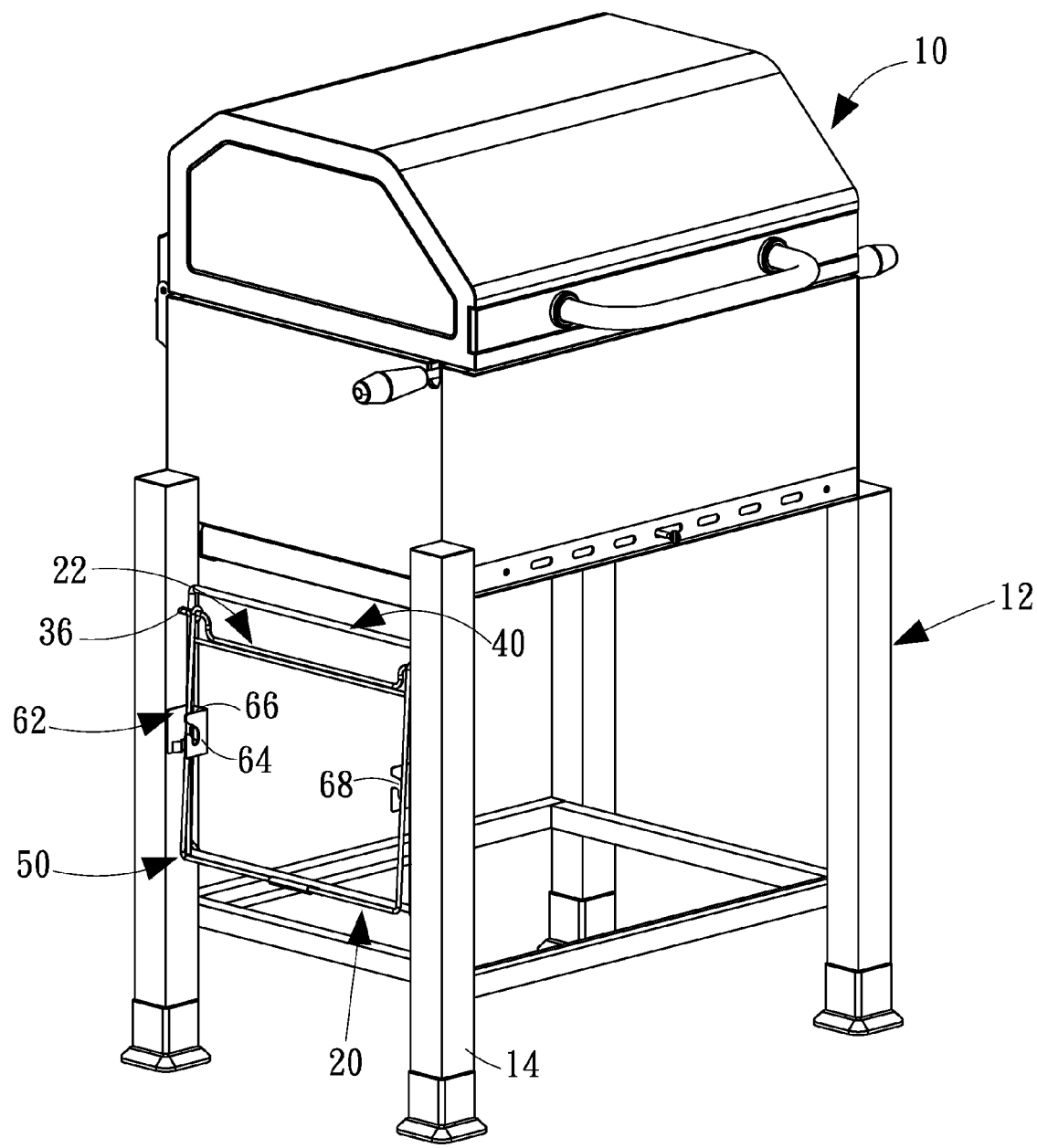
FIG. 2 is a perspective view of an apparatus for holding a bin-liner on a barbecue grill assembly according to the second embodiment of the present invention.

Referring to FIG. 1, there is shown an apparatus 20 for holding a bin-liner on a barbecue grill assembly according to the preferred embodiment of the present invention. The barbecue grill assembly includes a stove 10 supported on a base 12. The base 12 includes four posts 14 for example.

The apparatus 20 includes two lugs 16, a ledge 18, a first frame 22, a second frame 40 and a third frame 50. The lugs 16 and the ledge 18 are secured to the stove 10 by welding for example. The ledge 18 is placed lower than the lugs 16.

The first frame 22 includes two lateral bars 24 and an axle 30. Each of the lateral bars 24 includes a looped end 26 and a bent end 28.

The axle 30 includes a middle portion 32, two transient portions 34 and two pivots 36. The pivots 36 extend parallel to the middle portion 32 of the axle 30. Each of the transient portions 34 of the axle 30 extends to a respective one of the pivots 36 from the middle portion 32. One of the transient portions 34 of the axle 30 extends in an S-shaped manner while the other transient portion 34 of the axle 30 extends in a Z-shaped manner.

The second frame 40 includes a first crossbar 42, a second crossbar 44 and two lateral bars 46. The lateral bars 46 extend to the first crossbar 42 from the second crossbar 44.

The third frame 50 includes two lateral bars 52, a first crossbar 54 and a second crossbar 58. The lateral bars 52 extend from the first crossbar 54. Each of the lateral bars 52 includes a looped end 56. The second crossbar 58 is secured to the lateral bars 52 of the third frame 50 by welding for example. There is a buckle 60 secured to the first crossbar 54 by welding for example.

The bent end 28 of each of the lateral bars 24 is secured to a respective one of the pivots 36 by welding for example. Thus, the lateral bars 24 are connected to the axle 30 so that they are rotatable together. The looped end 26 of each of the lateral bars 24 is placed around the first crossbar 42 of the second frame 40. Thus, the second frame 40 is pivotally connected to the lateral bars 24. The looped end 56 of each of the lateral bars 52 of the third frame 50 is placed around a respective one of the pivots 36. Thus, the frame 50 is pivotally connected to the axle 30. Each of the pivots 36 is inserted in a respective one of the lugs 16.

The bent end 28 of each lateral bar 24 can abut a respective one of the lugs 16 to limit the movement of each pivot 36 relative to the respective lug 16. The looped end 56 of each lateral bar 52 is placed between a respective transient portion 34 of the axle 30 and a respective lateral bar 24 to limit the movement of the third frame 50 relative to the axle 30.

In use, the first frame 22 is placed in a horizontal position. The second crossbar 44 of the second frame 40 is placed on the ledge 18. Thus, the first frame 22 is kept in the horizontal position as the second frame 40 is placed on the ledge 18.

Referring to FIGS. 2 through 6, there is shown an apparatus for holding a bin-liner on a barbecue grill assembly according to a second embodiment of the present invention. The second embodiment is like the first embodiment except two things. At first, the entire apparatus 20 is connected to the base 12 instead of the stove 10. Secondly, there are used two brackets 62 instead of the ledge 18.

Each of the brackets 62 includes two lateral plates 64 extending from a middle plate 66. The first lateral plate 64 is secured to a respective one of the posts 14 by rivets, screws or welding for example. The second lateral plate 64 includes a cutout 68. The cutout 68 includes an open end and a closed end placed lower than the open end.

Each of the pivots 36 is inserted in a bore defined in a corresponding one of the posts 14. Thus, the entire apparatus 20 is pivotally connected to the base 12. Normally, the apparatus 20 is dangling, i.e., in a vertical position. The first frame 22, the second frame 40 and the third frame 50 are placed against one another. The third frame 50 is kept on the first frame 22 by the buckle 60.

Figure 3:
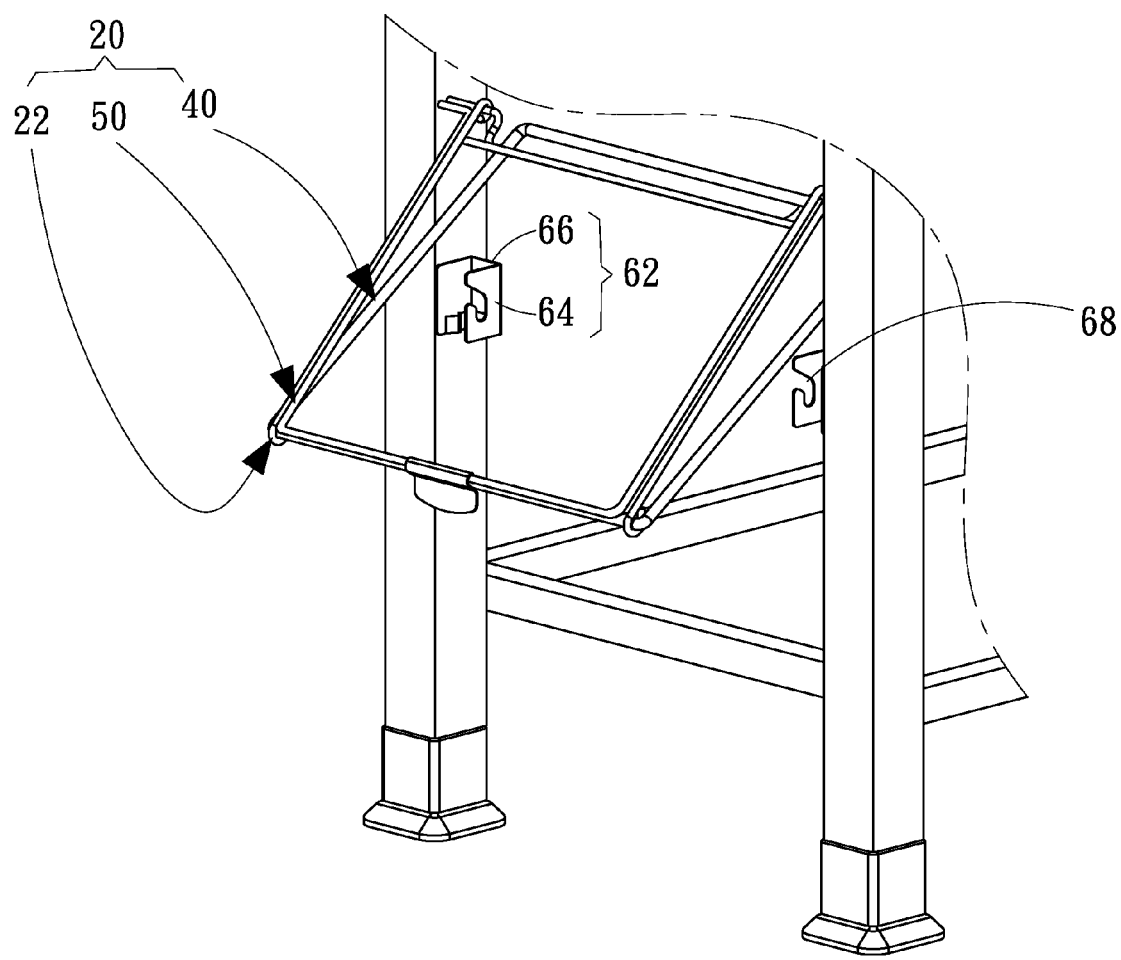
FIG. 3 is a partial, perspective view of the apparatus in another position than shown in FIG. 2.

Referring to FIG. 3, the apparatus 20 is pivoted from the vertical position. The first frame 22 is pivoted halfway to a horizontal position. The second frame 40 is pivoted from the first frame 22. The buckle 60 is engaged with the first crossbar 42 of the second frame 40 to keep the third frame 50 on the first frame 22 and the first crossbar 42 of the second frame 40.

Figure 4:
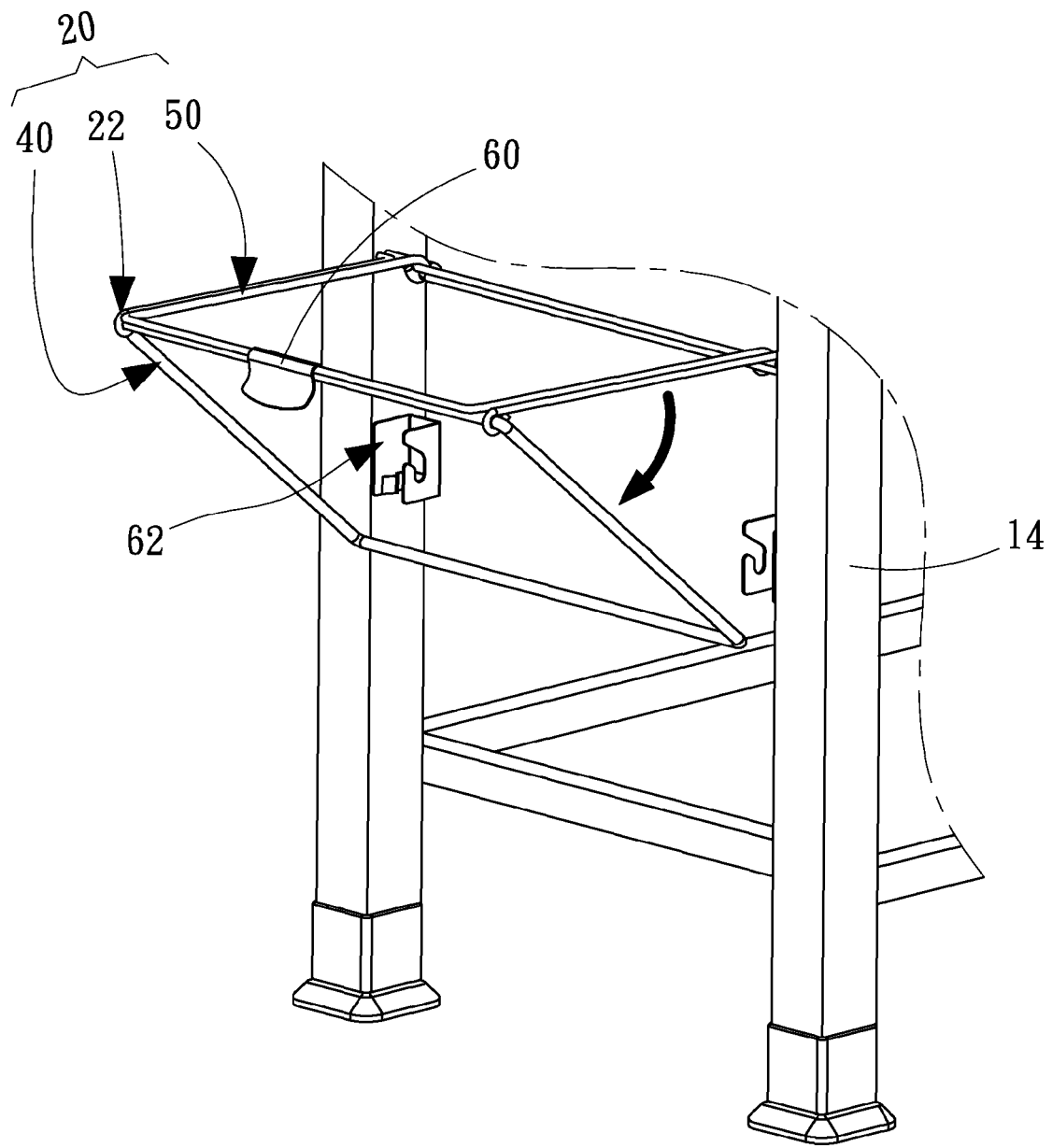
FIG. 4 is a partial, perspective view of the apparatus in another position than shown in FIG. 3.

Referring to FIG. 4, the first frame 22 is placed in the horizontal position. The second frame 40 is further pivoted from the first frame 22. The third frame 50 is kept on the first frame 22 and the first crossbar 42 of the second frame 40 as the buckle 60 is engaged with the first crossbar 42 of the second frame 40.

Figure 5:
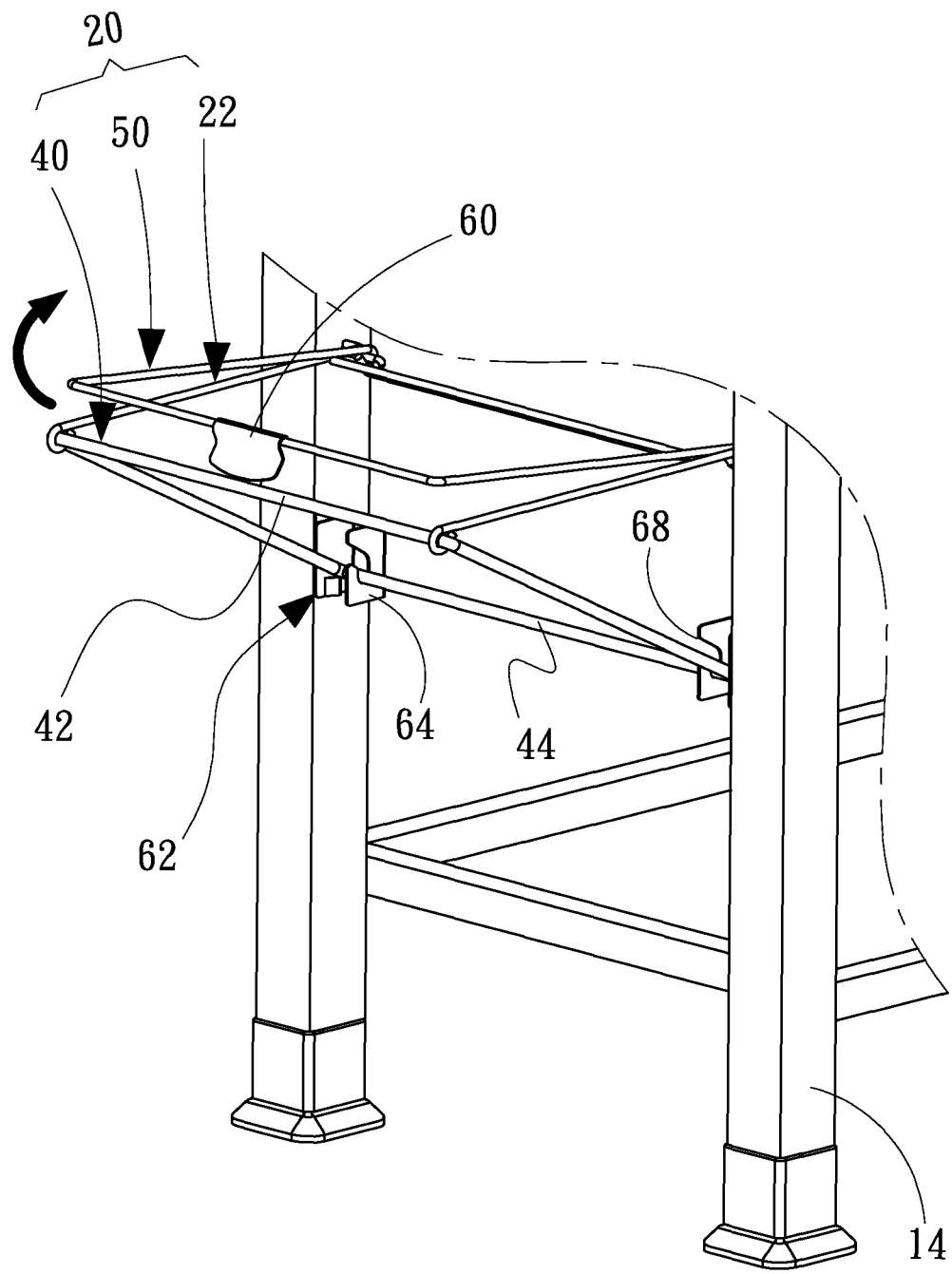
FIG. 5 is a partial, perspective view of the apparatus in another position than shown in FIG. 4.

Referring to FIG. 5, the second crossbar 44 of the second frame 40 is engaged with the brackets 62 to keep the first frame 22 in the horizontal position. The buckle 60 is disengaged from the first crossbar 42 of the second frame 40 to pivot the third frame 50 from the first frame 22.

Figure 6:
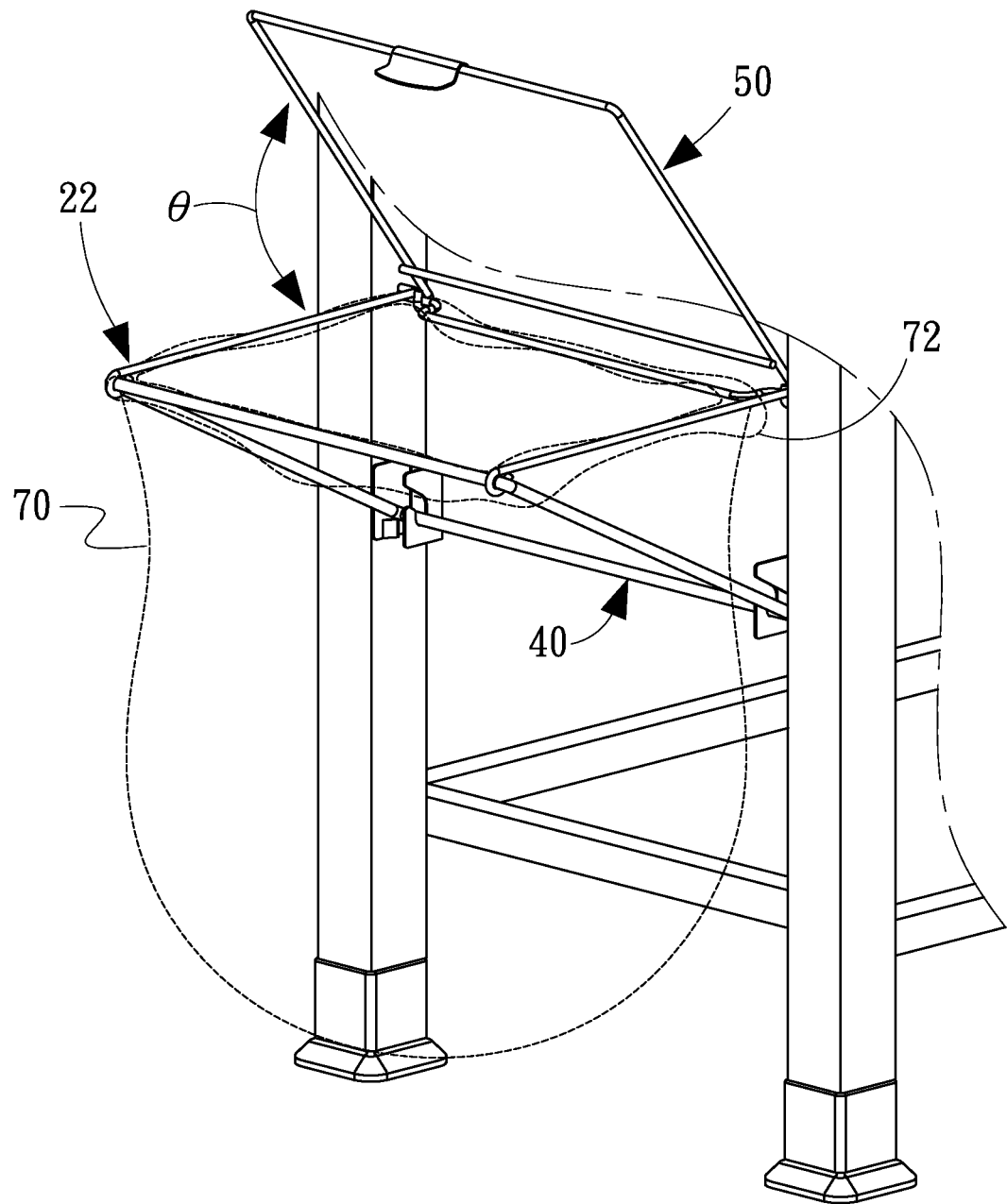
FIG. 6 is a partial, perspective view of the apparatus in another position than shown in FIG. 5.

Referring to FIG. 6, the first frame 22 is kept in the horizontal position as the second crossbar 44 of the second frame 40 is engaged with the brackets 62. The third frame 50 is further pivoted from the first frame 22.

There is provided a bin-liner 70 with an upper portion 72 extending around an open end thereof. The upper portion 72 of the bin-liner 70 is flipped over and placed on the first frame 22 and the first crossbar 42 of the second frame 40.

Figure 7:
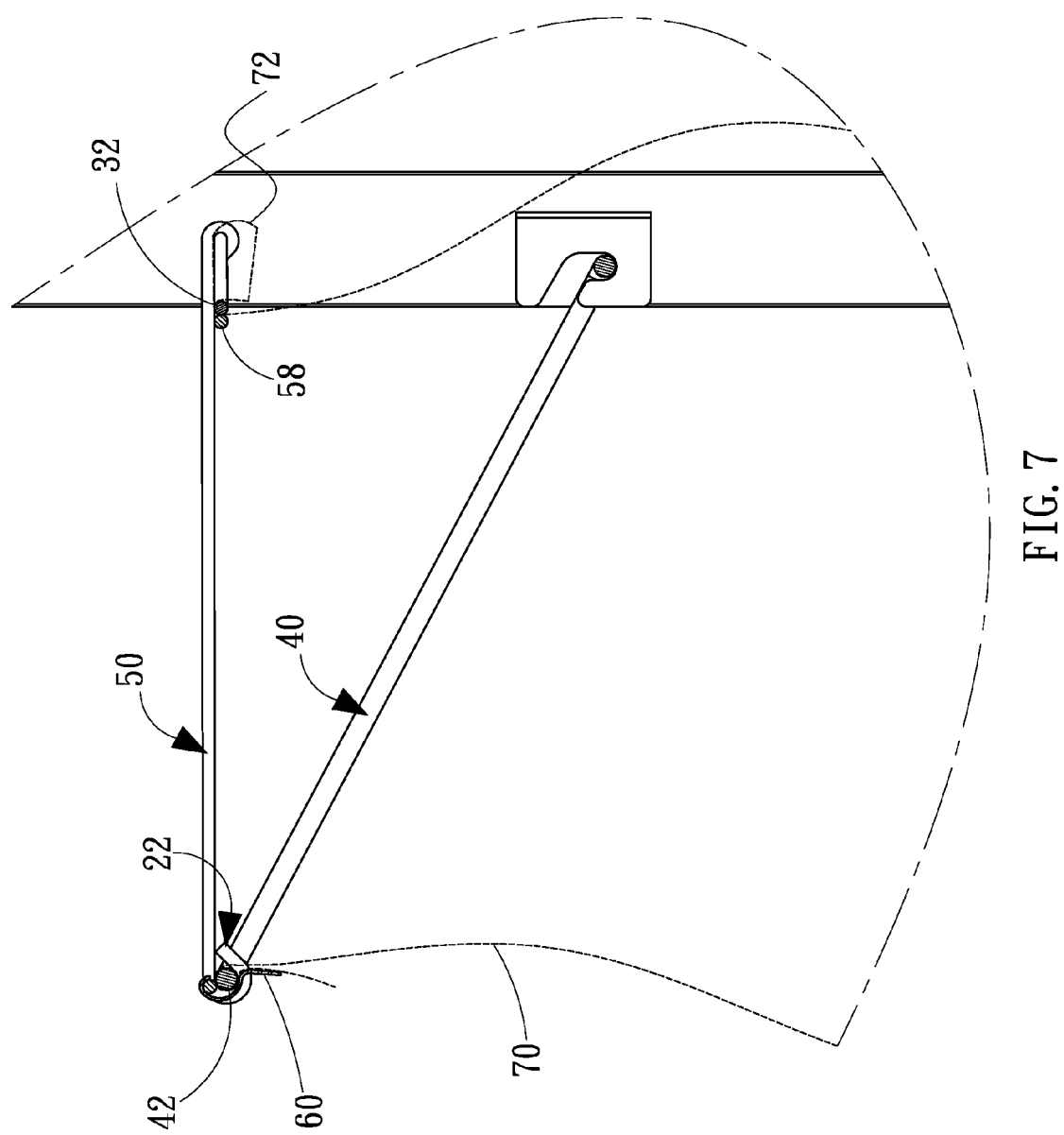
FIG. 7 is a cross-sectional view of the apparatus in another position than shown in FIG. 6.

Referring to FIG. 7, the first frame 22 is kept in the horizontal position as the second crossbar 44 of the second frame 40 is engaged with the brackets 62. The third frame 50 is placed on a side of the upper portion 72 of the bin-liner 70. Another side of the upper portion 72 of the bin-liner 70 is placed on the first frame 22 and the first crossbar 42 of the second frame 40. Thus, the upper portion 72 of the bin-liner 70 is clipped. Finally, the buckle 60 is engaged with the first crossbar 42 of the second frame 40, with the upper portion 72 of the bin-liner 70 placed between them. Thus, the upper portion 72 of the bin-liner 70 is firmly clipped and ready for use.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A barbecue grill assembly including:
a barbecue grill;
a base for supporting the barbecue grill;
a supporting unit connected to the base;
two lugs connected to the base;
a first frame including an axle formed with two pivots inserted in the lugs so that the axle is pivotally connected to the base and two lateral bars each formed with a looped end and a bent end connected to a corresponding one of the pivots, wherein an upper portion of a bin-liner can be flipped and placed on the first frame; and
a second frame including a first crossbar inserted in the looped ends of the lateral bars of the first frame, a second crossbar that can be supported on the supporting unit, and two lateral bars formed between the first and second crossbars, wherein the first frame is kept in a horizontal position as the second frame is supported on the supporting unit; and a third frame pivotally connected to the first frame, wherein the first and third frames are operable for clamping the upper portion of the bin-liner.

2. The apparatus according to claim 1, wherein the supporting unit includes a ledge connected to the barbecue grill assembly.

3. The barbecue grill assembly according to claim 1, wherein the third frame includes a first crossbar corresponding to the axle and two lateral bars connected to the first crossbar of the third frame.

4. The barbecue grill assembly according to claim 3, wherein each of the lateral bars of the third frame includes a looped end placed around the axle.

5. The barbecue grill assembly according to claim 4, wherein the axle includes a middle portion extending parallel to the pivots, and two transient portions each extending to a respective one of the pivots from the middle portion, wherein the looped end of each of the lateral bars of the third frame is placed around a respective one of the pivots, wherein the looped end of each of the lateral bars of the third frame is placed between a respective one of the transient portions of the axle and a respective one of the lateral bars of the first frame.

6. The barbecue grill assembly according to claim 5, wherein the first crossbar of the second frame is pivotally connected to the lateral bars of the first frame, and the two lateral bars of the second frame extending to the second crossbar from the first crossbar thereof.

7. The apparatus according to claim 6, wherein the supporting unit includes a ledge connected to the barbecue grill assembly.

8. The barbecue grill assembly according to claim 6, wherein the supporting unit includes two brackets connected to the base.

9. The barbecue grill assembly according to claim 8, wherein each of the brackets includes a first lateral plate connected to the base, a second lateral plate for supporting the second crossbar of the second frame, and a middle plate extending to the second lateral plate from the first lateral plate.

10. The barbecue grill assembly according to claim 9, wherein the second plate includes a cutout for receiving the second crossbar of the second frame.

11. A barbecue grill assembly including:
a barbecue grill;
a base for supporting the barbecue grill;
a supporting unit including two brackets each including a first lateral plate connected to the base, a second lateral plate for supporting the second crossbar of the second frame, and a middle plate extending to the second lateral plate from the first lateral plate;
two lugs connected to the base;
a first frame including an axle formed with two pivots inserted in the lugs so that the axle is pivotally connected to the base and two lateral bars connected to the axle and each formed with a looped end, wherein an upper portion of a bin-liner can be flipped and placed on the first frame; and
a second frame including a first crossbar inserted in the looped ends of the lateral bars of the first frame, a second crossbar that can be supported on the supporting unit, and two lateral bars formed between the first and second crossbars, wherein the first frame is kept in a horizontal position as the second frame is supported on the supporting unit.

12. The barbecue grill assembly according to claim 11, wherein the second plate includes a cutout for receiving the second crossbar of the second frame.

\* \* \* \* \*